Patented Aug. 25, 1931

1,820,046

UNITED STATES PATENT OFFICE

LAURIE LORNE BURGESS, OF CAMBRIDGE, MASSACHUSETTS, ASSIGNOR TO PLASTIC, INC., A CORPORATION OF NEW HAMPSHIRE

PROCESS OF MAKING PRODUCTS FROM VEGETABLE GROWTHS AND THE PRODUCT THEREOF

No Drawing.    Application filed August 17, 1927. Serial No. 213,690.

My invention relates to a process of making commercial products from sea growths of various kinds, as, for example, seaweed, kelp, etc.

The object of my invention is to provide a process by means of which vegetable growths found in the sea, such as seaweed, kelp, etc., one family of which is Laminaria, and especially the seaweeds and kelp which are abundant in the colder ocean waters, may be readily treated so as to be used for manufacturing purposes. Difficulty has been found previously in the utilization of these vegetable growths extensively, because of the cost of manufacture. These vegetable materials contain two organic compounds in large proportions, one of which is algin and the other of which is algulose, and it has been found difficult to utilize these materials on any extensive commercial scale because of the cost of treatment, due to the different properties of these two substances. It has been found especially difficult to chemically or physically reduce the algulose, a compound of cellulosic properties, with ordinary reagents. I have discovered a process by means of which sea growths may be treated so as readily to chemically and physically reduce the algulose as well as the algin, in order that a product readily may be obtained containing both of these materials, which may be worked and handled eventually in the manufacture of articles of any desired kind.

While my invention is capable of embodiment in many different forms, for the purposes of illustration, I shall describe only certain forms of the same hereinafter.

In general my invention relates to the use of a colloid protective agent, that is to say, a colloid adapted to prevent or retard agglomeration, in the presence of an alkaline reagent whereby the algulose or, in fact, the whole plant may be chemically and physically reduced to a suspensoid solution or emulsion, which can be used in manufacturing at a very low cost.

For example, 10 pounds of wet seaweed, preferably kelp of the Laminaria family, are washed in fresh water and thereafter, 2½ ounces of sodium carbonate dissolved in 1,000 c. c. of water are added and the mass well stirred. I then add 1½ ounces of tannic acid dissolved in 500 c. c. of water, which is stirred into the mass. After the mixture has stood for half an hour or longer, I add 1 gal. of water and mix the mass in any suitable mixing device adapted to give the mixture a violent agitation, until the solution or emulsion is complete, and the liquid when run on to a glass plate gives a homogeneous film.

It will, of course, be understood that I may use any other alkaline reagent, and other alkaline salts which I may use are, for example, sodium hydrate, potassium carbonate, magnesium carbonate, etc. Also, instead of the tannic acid I may use any other suitable protective colloid such as gallic acid, poly-oxy benzoic acids, their homologues and derivatives, etc.

While I have described my invention above in detail, I wish it to be understood that many changes may be made therein without departing from the spirit thereof.

I claim:

1. The process of extraction and production of a suspensoid solution of algin and algulose which comprises washing a quantity of vegetable sea growth with fresh water, and treating the same with a colloid protective agent in the presence of an alkaline reagent.

2. The process of extraction and production of a suspensoid solution of algin and algulose which comprises washing a quantity of vegetable sea growth with fresh water, treating the washed sea growth with a colloid protective agent in the presence of an alkaline reagent, permitting the reaction to take place for a predetermined period of time and violently agitating the mixture until the solution or emulsion is complete.

3. The process of extraction and production of a suspensoid solution of algin and algulose which comprises treating a vegetable sea growth material with a colloid protective agent in the presence of an alkaline solution of sodium carbonate.

4. The process of extraction and production of a suspensoid solution of algin and algulose which comprises washing a quantity of vegetable sea growth with fresh water, treating the washed sea growth with a colloid protective agent in the presence of an alkaline solution of sodium carbonate permitting the reaction to take place for a predetermined period of time and violently agitating the mixture until the solution or emulsion is complete.

In testimony that I claim the foregoing, I have hereunto set my hand this 13th day of August, 1927.

LAURIE LORNE BURGESS.